United States Patent [19]

Lucas

[11] Patent Number: 4,555,420
[45] Date of Patent: Nov. 26, 1985

[54] CURABLE SILICONE COMPOSITIONS AND PROCESSES

[75] Inventor: Gary M. Lucas, Scotia, N.Y.

[73] Assignee: General Electric Company, Waterford, N.Y.

[21] Appl. No.: 627,954

[22] Filed: Jul. 5, 1984

[51] Int. Cl.[4] .................... C08G 77/04; C08G 77/06; C08K 3/36; C08K 3/26

[52] U.S. Cl. ................................ 427/387; 524/860; 524/861; 524/862; 528/10; 528/18; 528/33; 528/34; 528/901

[58] Field of Search ............... 528/901, 18, 10, 33, 528/34; 524/860, 861, 862; 427/387

[56] References Cited

U.S. PATENT DOCUMENTS

| | | | |
|---|---|---|---|
| 3,341,486 | 9/1967 | Murphy | 260/18 |
| 3,417,047 | 12/1968 | Golitz et al. | 260/37 |
| 3,441,583 | 4/1969 | Murphy | 260/448.2 |
| 3,488,371 | 1/1970 | Klebe | 260/448.2 |
| 3,766,127 | 10/1973 | Clark et al. | 260/37 SB |
| 3,766,128 | 10/1973 | Brady et al. | 260/37 SB |
| 3,817,909 | 6/1974 | Toporcer et al. | 260/37 SB |
| 3,996,184 | 12/1976 | Klosowski | 260/32.6 |
| 4,100,129 | 7/1978 | Beers | 260/37 SB |
| 4,323,489 | 4/1982 | Beers | 524/788 |
| 4,360,631 | 11/1982 | Hahn | 524/788 |
| 4,410,677 | 10/1983 | Lampe | 528/17 |
| 4,417,042 | 11/1983 | Dziark | 528/22 |
| 4,424,157 | 1/1984 | Chung | 528/18 |
| 4,454,262 | 6/1984 | Fukayama | 528/33 |
| 4,461,867 | 7/1984 | Surprenant | 528/17 |
| 4,483,973 | 11/1984 | Lucas et al. | 528/33 |

Primary Examiner—Herbert J. Lilling
Attorney, Agent, or Firm—Gary L. Loser

[57] ABSTRACT

There is provided a room temperature vulcanizable silicone composition comprising a polyalkoxy-terminated polydiorganosiloxane and a difunctional nitrogen-containing silane. Processes for making such room temperature vulcanizable compositions are also provided.

38 Claims, No Drawings

CURABLE SILICONE COMPOSITIONS AND PROCESSES

BACKGROUND OF THE INVENTION

The present invention relates to curable silicone rubber compositions. More particularly, the present invention relates to one-component, alkoxy-functional, room temperature vulcanizable (RTV) silicone compositions which exhibit low modulus upon curing. Processes for making such low modulus silicone compositions are also provided.

Elastomeric siloxane compositions capable of vulcanizing at room temperature have achieved considerable commercial success. In certain applications, such as high rise building construction, it is desirable and often critical to utilize low modulus sealants for adhering the window panes to the metal frame of the building. This low modulus property enables the silicone elastomer to easily compress and expand with building movement due to winds and the like without causing cohesive or adhesive failure. In addition to being a low modulus composition, it is often important that the silicon composition also have high tensile strength and high elongation. These properties will ensure that the silicone elastomer can accommodate, for example, plus or minus 50% compression or extension in the joints without failing. Of course, the more the sealant can expand and compress in terms of thickness of the joint, the more desirable it is for use as a construction sealant.

Because of the recent emphasis by architects on "mirrored" high rise buildings, that is, the exterior of the building appears to be a large mirror, for both aesthetic and energy-saving reasons, there has been a great deal of interest in providing suitable low modulus silicone sealants. Perhaps the most common type of low modulus silicone sealant is based on a silanol endblocked polydiorganosiloxane in combination with any of a number of crosslinking and/or coupling agents which impart low modulus to the cured composition.

Murphy, U.S. Pat. No. 3,341,486, describes room temperature vulcanizable organopolysiloxane compositions comprising a silanol terminated polydiorganosiloxane and a mixture of a difunctional silicon-nitrogen material having attached to silicon two radicals of the unit formula

and a polyfunctional silicon-nitrogen material attached to silicon having at least three aminoxy radicals of the unit formula

where Y is a monovalent amine radical and R'' is a monovalent hydrocarbon radical, alkoxy radical or triorganosiloxy radical.

Golitz, U.S. Pat. No. 3,417,047, relates to organopolysiloxane compositions curable at room temperature to elastomers comprising a silanol endstopped polydiorganosiloxane and an organosilicon crosslinking agent having the formula

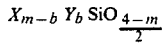

where X is hydrogen, alky or aryl, m equals 1 to 4, b has a positive value of at least 3 per molecule of organosilicon compound and Y is a Si—N bonded carboxylic acid amide radical.

Murphy, U.S. Pat. No. 3,441,583, discloses aminoxyorganosilicon materials useful as curing agents and coupling agents in silanol-containing organopolysiloxane compositions.

Klebe, U.S. Pat. No. 3,488,371, involves the production of linear difunctional silylamides which are useful in the preparation of linear polysiloxanes and which cure to rubbery materials upon exposure to moisture at room temperature.

Clark et al., U.S. Pat. No. 3,766,127, discloses a composition stble under moisture free conditions and curable to a low modulus silicone elastomer comprising a mixture of 100 parts by weight of a hydroxyl endblocked polydiorganosiloxane; 0 to 150 parts by weight of a non-acidic, non-reinforcing filler; 3.5 to 8 parts by weight of

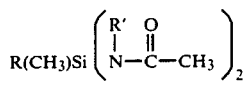

in which R is methyl or vinyl, R' is methyl, ethyl or phenyl and 0.3 to 4.2 parts by weight of

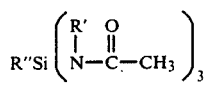

in which R' is defined above and R'' is the same as R.

Brady et al., U.S. Pat. No. 3,766,128, relates to a low modulus room temperature vulcanizable silicone elastomer obtained by curing a mixture of 100 parts by weight of a hydroxyl endblocked polydiorganosiloxane; 0 to 150 parts by weight of a non-acidic, non-reinforcing filler; 2 to 7.5 parts by weight methylvinyldi-(N-methylacetamido)silane and 0.5 to 4 parts by weight of an aminosilane of the formula RSi(NR'R'')₃ in which R is alkyl, phenyl or vinyl, R' is hydrogen or alkyl and R'' is alkyl or phenyl.

Toporcer et al., U.S. Pat. No. 3,817,909, describes low modulus room temperature vulcanizable silicone elastomers obtained by mixing 100 parts by weight of a hydroxyl endblocked polydiorganosiloxane; 0 to 150 parts by weight of a non-acidic, non-reinforcing filler; 2 to 20 parts by weight of

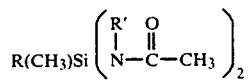

in which R is methyl, vinyl or phenyl and R' is methyl, ethyl or phenyl and 0.25 to 7 parts by weight of an aminooxysilicon compound having 3 to 10 aminoxy groups per molecule.

Klosowski, U.S. Pat. No. 3,996,184, relates to a one package, low modulus, room temperature vulcanizable composition obtained by mixing 100 parts by weight of a hydroxyl endblocked polydimethylsiloxane; 0 to 200 parts by weight of a nonacidic, non-reinforcing filler; 2.5 to 10 parts by weight of

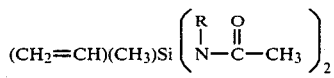

in which R is methyl or phenyl; 1 to 6 parts by weight of an aminoxysilicon compound having 3 to 10 aminoxy groups per molecule; and 1 to 5 parts by weight of N,N-dimethylformamide, acetonitrile, or N-n-butylacetamide.

Beers, U.S. Pat. No. 4,100,129, discloses self-bonding, low modulus, one-package room temperature vulcanizable silicone compositions comprising a silanol chain-stopped polydiorganosiloxane; a crosslinking silane; and a silanol reactive organo-metallic ester compound of a metal, the compound having radicals attached to the metal atom, at least one of the radicals being a substituted or unsubstituted hydrocarbonoxy radical, attachment being through an M—O—C linkage where M is the metal, and any remaining valences of M are satisfied by other organo radicals attached to M through such linkages, or an —OH, —O—, or M—O—M linkage, the weight ratio of the organometallic ester to silane being at least 0.5 to 1.

Beers, U.S. Pat. No. 4,323,489, teaches a room temperature vulcanizable silicone rubber composition with low modulus comprising a silanol endstopped diorgaopolysiloxane, a difunctional acetamide coupler, and as the crosslinking agent, a minor amount of compound selected from ketoxime functional and aminoxy functional silanes and mixtures thereof.

Hahn, U.S. Pat. No. 4,360,631, describes a flowable, low modulus, room temperature vulcanizable silicone composition obtained by mixing 100 parts by weight of hydroxyl endblocked polydiorganosiloxane; 0 to 150 parts by weight of a nonacidic, non-reinforcing filler; 2 to 20 parts by weight of methylvinyldi-(epsilon-caprolactamo)silane and 0.25 to 7 parts by weight of an aminoxysilane compound having 3 to 10 aminoxy groups per molecule.

Lampe, U.S. Pat. No. 4,410,677, provides a low modulus, room temperature vulcanizable silicone rubber composition with a good shelf life comprising a silanol containing polysiloxane, a filler, an acyloxy functional silane as the crosslinking agent, and as the catalyst, a compound selected from the group consisting of zinc salts and zirconium salts, or a co-catalyst system comprising as one co-catalyst a tin salt of a carboxylic acid and as the other co-catalyst, either a zinc salt or a zirconium salt of a carboxylic acid.

Those skilled in the art will readily appreciate that all of the foregoing disclosures depend on the use of silanol(monofunctional) terminated polydiorgaosiloxanes. Such siloxanes are easily chain-extended, e.g. coupled, upon exposure to atmospheric moisture to obtain low modulus silicone rubber compositions.

Another class of silicone rubber compositions is based on polyalkoxy(polyfunctional) terminated polydiorganosiloxanes as originally disclosed by Brown et al. in U.S. Pat. No. 3,161,614. Such compositions, however, are not easily made to be low modulus upon curing because they already contain terminal groups which will effect crosslinking rather than coupling. Accordingly, it is desirable to provide low modulus polyalkoxy-functional silicone compositions.

Cooper et al., U.S. Pat. No. 3,542,901, teaches that one-component silicone RTV compositions of the type disclosed by Brown et al. are ineffective for certain sealing applications because the modulus is too high. Cooper et al. goes on to disclose a method to provide compositions vulcanizable to low modulus rubbers comprising utilizing a polydiorganosiloxane having therein a proportion, up to 40 percent, of terminal units of the formula —SiR$_3$, the remaining terminal units being alkoxy functional. Preferably the polydiorganosiloxane has a viscosity within the range of 2,000 to 20,000 centipoise at 25° C.

Beers, U.S. patent application Ser. No. 349,537, filed Feb. 17, 1982, discloses that alkoxy functional RTV compositions of the type disclosed by White et al., U.S. Pat. No. 4,395,526, and Dziark, U.S. Pat. No. 4,417,042, can be made low modulus by adding thereto from 2 to 20 parts by weight of a plasticizer fluid containing a high degree of trifunctional siloxy units or a mixture of trifunctional and tetrafunctional siloxy units. Optionally, additional plasticizers such as linear triorganosiloxy endstopped polydiorganosiloxanes having a viscosity ranging from 10 centipoise to 20,000 centipoise can be included in the composition.

All of the foregoing patents and patent applications are incorporated by reference into the present patent application.

Although a wide choice is thus seen to be available for the preparation of low modulus, one-component RTV compositions, there has not been much appreciation by those skilled in the art of the factors involved in securing specific properties in the cured silicone rubber, especially when the polysiloxane is polyalkoxy functional. It has now been discovered that low modulus, silicone rubber compositions can be prepared from polyalkoxy functional polydiorganosiloxanes by employing therewith certain silanes having attached thereto two nitrogen-containing radicals.

SUMMARY OF THE INVENTION

It is an object of the present invention to provide polyalkoxy functional, one component silicone RTV compositions which cure upon exposure to moisture to low modulus silicone rubber.

It is another object of the present invention to provide silicone RTV compositions especially useful as construction sealants.

It is still another object of the present invention to provide a process for preparing curable one-component, silicone RTV composition having low modulus in the cured state.

In accordance with the foregoing objects there is provided a polyalkoxy functional silicone RTV composition comprising:

(A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.;

(B) at least 0.01 part by weight of at least one silane having the formula $Z_2SiX_2$ where X is an amino, amido or aminoxy radical or mixture of such radicals, and Z is a substituted or unsubstituted organic radical or mixture thereof.

Preferably the compositions of the present invention further include a condensation catalyst and a scavenger for hydroxy functional groups.

Other objects and advantages of the present invention will be obvious from the following detailed description, including the examples.

DESCRIPTION OF THE INVENTION

The basic component of the one package room temperature vulcanizable composition of the present invention is a polyalkoxy terminated polydiorganosiloxane having a viscosity ranging from about 20,000 centipoise to about 500,000 centipoise at 25° C. Preferably, the viscosity of the polydiorganosiloxane ranges from 30,000 centipoise to 200,000 centipoise, and, most preferably, the viscosity ranges from 40,000 centipoise to 80,000 centipoise at 25° C.

The organo groups of said polydiorganosiloxane are selected from $C_{(1-13)}$ monovalent substituted and unsubstituted hydrocarbon radicals. Preferably the organo groups are methyl or a mixture of a major amount of methyl and a minor amount of phenyl, cyanoethyl, vinyl, 3,3,3-trifluoropropyl, or mixture thereof. Examples of other suitable organo groups are aryl radicals and halogenated aryl radicals such as phenyl, tolyl, chlorophenyl and naphthyl; aliphatic and cycloaliphatic radicals such as cyclohexyl, cyclobutyl, alkyl and alkenyl radicals such as ethyl, propyl, chloropropyl, vinyl and allyl; and cyanoalkyl radicals such as cyanoethyl, cyanopropyl and cyanobutyl.

Also included within the intended scope of polyalkoxy functional polysiloxanes are the polymers described in the copending patent application of Gary M. Lucas, Ser. No. 449,105, filed Dec. 13, 1982, and incorporated herein by reference. Briefly, this patent application discloses polymers which contain a mixture of polyalkoxy and monoalkoxy terminated polydiorganoxiloxanes as well as polymers which are terminated with one alkoxy radical and one radical selected from the group consisting of silazy, amido, amino, carbamato, enoxy, imidato, isocyanato, oximato, thioisocyanato and ureido radicals.

Polydiorganosiloxanes useful for practicing the present invention as well as methods for their preparation are well known to those skilled in the art. The reader interested in obtaining more detailed information is referred to U.S. Pat. Nos. 3,161,614, 3,383,355, 3,542,901 and 4,395,526, all of which are incorporated herein by reference.

The other required ingredient of the one-component room temperature vulcanizable silicone composition of the present invention is at least one silane of the formula $$Z_2SiX_2$$

where X is an amino, amido or aminoxy radical or mixture thereof, and Z is a substituted or unsubstituted organic radical or mixture thereof.

Included by the difunctional nitrogen-containing silane of the foregoing formula are diaminoxy silanes having the formula $$R_2Si(OY)_2$$

where R is selected from monovalent hydrocarbon radicals and akoxy radicals; and Y is a monovalent amine radical of the formula $—N(R^1)_2$, where $R^1$ is hydrogen or a monovalent hydrocarbon radical, or a heterocyclic amine attached to silicon by an SiON linkage. The foregoing silicon-nitrogen materials and methods for making them are described in U.S. Pat. No. 3,441,583 to Murphy.

Examples of diaminoxy silanes that can be employed in the practice of the invention are:

$(CH_3)_2Si(ON(CH_2CH_3)_2)_2$
$(C_6H_5)_2Si(ON(CH_3)(C_2H_5))_2$
$(CH_3CH_2O)_2Si(ON(CH_2CH_2CH_3)_2)_2$

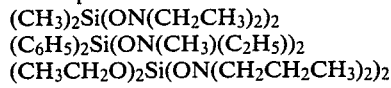

Also included within the scope of the difunctional nitrogen-containing silanes are amidosilanes of the formula

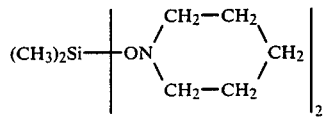

where R and $R^1$ are as previously defined and $R^2$ is a monovalent hydrocarbon radical which may be the same or different from $R^1$. Such amidofunctional silanes are described in greater detail in U.S. Pat. No. 3,766,127 to Clark et al.

Preferably R is methyl or vinyl, $R^1$ is methyl, ethyl or phenyl and $R^2$ is methyl. Accordingly, the preferred amidosilanes are:
methylvinyldi-(N-methylacetamido)silane;
dimethyldi-(N-methylacetamido)silane;
methylvinyldi-(N-ethylacetamido)silane;
dimethyldi-(N-ethylacetamido)silane;
methylvinyldi-(N-phenylacetamido)silane and
dimethyldi-(N-phenylacetamido)silane.

A third class of difunctional nitrogen-containing silanes useful for practicing the present invention are aminosilanes of the formula $$(R^2)_2Si(NR^1R^2)_2$$

where $R^1$ and $R^2$ are as previously defined. Preferably $R^2$ is a monovalent alkyl radical having 1 to 6 carbon atoms, phenyl or vinyl. The $R^2$ radical bonded to silicon need not be the same as the $R^2$ radical bonded to nitrogen. Preferably $R^1$ is hydrogen or a monovalent alkyl radical having 1 to 6 carbon atoms.

Examples of amines within the aforesaid formula which can be used in practicing the instant invention are:
dimethyldi(phenylamino)silane,
diethyldi(phenylamino)silane,
methylvinyldi(phenylamino)silane,
dimethyldi(n-butylamino)silane,
dipropyldi(n-butylamino)silane,
methylvinyldi(n-butylamino)silane,
diphenyldi(dimethylamino)silane, and
dimethyldi(methylhexylamino)silane.

Other suitable aminoxysilanes, amidosilanes and aminosilanes will be obvious to those of ordinary skill in the art. Similarly, those of ordinary skill in the art will be able to prepare suitable aminoxysilanes, amidosilanes and aminosilanes without undue experimentation.

Generally, the amount of difunctional nitrogen-containing silane employed in the practice of the present invention ranges from about 0.01 to about 10 parts by weight based on 100 parts by weight of the polydiorganosilane. More preferably, there is utilized from about 0.5 to about 5 parts by weight difunctional nitrogen-containing silane per 100 parts by weight polydiorganosiloxane.

If less than about 0.01 parts of difunctional nitrogen-containing silane is utilized a low modulus composition will not be obtained. More than ten parts difunctional nitrogen-containing silane can be employed, however, no advantage is thereby obtained.

In addition to the aforementioned materials that are used in the room temperature vulcanizable compositions of the present invention there can also be utilized fillers. Suitable reinforcing fillers include fumed silica and precipitated silica in an amount of up to about 5 percent by weight in order to obtain optimum low modulus. Such reinforcing fillers are particularly useful if it is desired to increase the tensile strength of the cured elastomer. A disadvantage of using reinforcing fillers, however, is that they tend to increase the viscosity of the uncured composition and decrease the elongation of the cured composition. These disadvantages can be overcome to a large extent by treating the filler with cyclopolysiloxanes, for example, as taught in U.S. Pat. No. 2,938,009, or with silazanes, as taught in U.S. Pat. No. 3,635,743. Both of these patents are incorporated by reference into the present disclosure. Other methods for treating reinforcing fillers to overcome the aforesaid disadvantages are also known to those skilled in the art.

Suitable extending fillers for practicing the present invention include titanium dioxide, zirconium silicate, silica aerogel, iron oxide, diatomaceous earth, glass fibers, polyvinyl chloride, ground quartz, lithopone, zinc oxide, calcium carbonate, magnesium oxide, zirconium oxide, aluminum oxide, calcined clay, carbon black, graphite and the like. Extending fillers are especially useful if it is desired to increase tensile strength without unduly decreasing the elongation of the cured composition, and without unduly increasing the viscosity of the uncured composition. Preferably, there can be present up to 100 parts by weight extending filler per 100 parts by weight polydiorganosiloxane.

It has been found that fumed silica, especially treated fumed silica, is the most preferred reinforcing filler and that calcium carbonate is the most preferred extending filler. In a particularly preferred embodiment there is utilized from one to five parts by weight reinforcing filler, preferably treated fumed silica, and from thirty to forty five parts by weight extending filler, preferably calcium carbonate, per 100 parts by weight polydiorganosiloxane.

The compositions of the present invention can also optionally include an effective amount of adhesion promoter or mixture of adhesion promoters. By "an effective amount" is generally meant from 0.05 to 5 parts by weight of adhesion promoter per 100 parts by weight polydiorganosiloxane. Of course those skilled in the art may utilize more or less depending upon the particular application under consideration as well as the substrate to which the sealant will be applied.

Particularly preferred adhesion promoters are disclosed in U.S. patent application Ser. No. 349,538, filed Feb. 17, 1982, now U.S. Pat. No. 4,483,973. Briefly, such adhesion promoters have the general formula

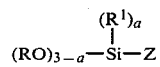

where R and $R^1$ are independently selected $C_{(1-8)}$ monovalent hydrocarbon radicals, a varies from 0 to 3, and Z is a saturated, unsaturated, or aromatic hydrocarbon residue further functionalized by a member selected from the group consisting of amino, ether, epoxy, cyano, isocyanato, acryloxy, acyloxy and mixtures thereof.

Examples of particularly preferred adhesion promoters are, for example,
γ-glycidoxypropyltrimethoxysilane,
tris(1,3,5-trimethoxysilylpropyl)isocyanurate,
δ-isocyanatopropyltrimethoxysilane,
δ-methacryloxypropyltrimethoxysilane,
δ-acetoxypropyltrimethoxysilane, vinyltrimethoxysilane,
β-(3,4-epoxycyclohexyl)ethyltrimethoxysilane,
β-cyanoethyltrimethoxysilane,
δ-aminopropyltrimethoxysilane,
δ-aminopropyltriethoxysilane, and
3-(2-aminoethylamino)propyltrimethoxysilane.

Smith et al., U.S. Pat. No. 4,273,698, discloses maleate, fumarate and succinate functional adhesion promoters suitable for use in practicing the present invention. Generally, these compounds have the formulas:

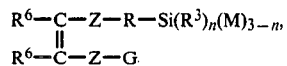

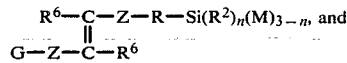

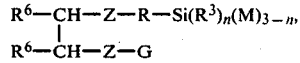

respectively, where Z is selected from

phenylene, C=O, CONH and $CON(R^2)_2$,

G is selected from the group consisting of hydrogen, $R^1$, and $R^4Si(R^2)_n(M)_{3-n}$ where $R^1$ is a monovalent hydrocarbon radical or halogenated monovalent hydrocarbon radical; R is a divalent hydrocarbon radical, $R^2$ is a monovalent hydrocarbon radical or halogenated hydrocarbon radical, M is selected from $R^3O$, $R^3$, and

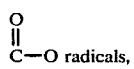

where $R^3$ is a monovalent hydrocarbon radical or halogenated monovalent hydrocarbon radical, $R^6$ is hydrogen or an alkyl radical of up to 10 carbon atoms, and n varies from 1 to 3.

A particularly preferred adhesion promoter within the aforesaid description is bis(trimethoxysilylpropyl)-maleate. The corresponding fumarates and succinates are also preferred adhesion promoters.

Both U.S. patent application Ser. No. 349,538, filed Feb. 17, 1982, now U.S. Pat. No. 4,483,973, and U.S. Pat. No. 4,273,698 are incorporated into the present application by reference. Other suitable adhesion promoters can be found in U.S. Pat. Nos. 3,517,001, 3,816,494, 3,888,815 and 4,036,813, all of which are also incorporated herein by reference.

Effective amounts of condensation catalysts which can be used in the practice of the present invention to facilitate the cure of the RTV composition are, for example, from about 0.001 to about 5 parts by weight based on the weight of polydiorganosiloxane. Suitable condensation catalysts well known to those skilled in the art include tin compounds, such as dibutyltindilaurate, dibutyltindiacetate, dibutyltindimethoxyide, tin octoate, dimethyl tin dibutyrate, tin oleate, and tin naphthenate; titanium compounds, such as 1,3-propanedioxytitanium bis(acetylacetonate), diisopropoxytitanium bis(acetyacetonate), titanium naphthenate, tetrabutyltintitanate and tetraphenyltitanate; other metal compounds, such as zirconium octoate, lead-2-ethyloctoate, iron-2-ethylhexoate, cobalt-2-ethylhexoate, antimony octoate and zinc stearate; and non metal compounds such as hexylammonium acetate and benzyltrimethylammonium acetate. These and many other compounds are well known to those skilled in the art as suitable condensation cure catalysts.

Optionally, there may be included in the silicone RTV composition of the present invention a silane crosslinking agent of the formula

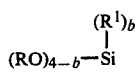

where R is a $C_{(1-8)}$ aliphatic organic radical selected from alkyl radicals, alkylether radicals, alkylester radicals, alkylketone radicals and alkylcyano radicals or a $C_{(7-13)}$ aralkyl radical, and $R^1$ is a $C_{(1-13)}$ monovalent organic radical. Such crosslinking agents are well known in the art and described more fully, for example, in U.S. Pat. No. 4,395,526.

In a particularly preferred embodiment of the instant invention there is further included a stabilizing amount of scavenger for hydroxy functional groups. Particularly preferred scavengers for hydroxy functional groups are disclosed in U.S. Pat. Nos. 4,395,526 and 4,417,042, both of which are incorporated by reference into the present application.

Other scavengers for hydroxy functional groups are described in U.S. patent application Ser. Nos. 497,954, filed May 25, 1983; 338,518, filed Jan. 11, 1982; 428,038, filed Sept. 29, 1982; 497,777, filed May 25, 1983; 464,443, filed Feb. 7, 1983; and 476,000, filed Mar. 17, 1983. Each of the foregoing patent applications is hereby incorporated by reference into the present disclosure.

Where desired, the artisan may further include sag control agents, pigments, flame retardants and the like.

The room temperature vulcanizable compositions of the instant invention can be made by agitating, or example stirring, a mixture of polyalkoxy-terminated polydiorganosiloxanes, difunctional, nitrogen-containing silane, and any of the optional ingredients noted hereinabove such as a scavenger for hydroxy functional groups, filler, adhesion promoter, sag control agent and the like, in the substantial absence of moisture. The term "substantial absence of moisture" means mixing in a dry box or in a closed container which has been subjected to vacuum to remove air and which thereafter is replaced with a dry inert gas such as nitrogen. Temperatures can vary from about 0° C. to about 180° C., depending upon the degree of blending, they type and amount of filler, and the like.

The compositions of this invention when cured provide elastomers having a modulus at 50% extension of less than about 70 psi. The compositions also provide cured elastomers having an ultimate tensile strength of about 150 to 300 psi, an ultimate percent elongation of about 500 to 1200, a durometer (Shore A) of about 20–40 psi.

In order to better enable the artisan to practice the present invention the following examples are provided by way of illustration and are not by way of limitation. All parts are by weight unless otherwise stated.

EXAMPLES

Example 1

A suitable mixer equipped with a vacuum line and nitrogen purge was charged with 840 parts by weight of a methyldimethoxy terminated polydimethylsiloxane having a viscosity of 120,000 centipoise at 25° C., 840 parts by weight of a methyldimethoxy terminated polydimethylsiloxane having a viscosity of 25,000 centipoise at 25° C., 144 parts octamethylcyclopolysiloxane treated fumed silica and 1440 parts calcium carbonate. The mixture was agitated under vacuum (20 mm Hg) at room temperature for one hour. To 1500 parts of this base there was added 30 parts hexamethyldisilazane, 15 parts cyanoethyltrimethoxysilane, 1.5 parts dibutyltindiacetate, and 1, 2, and 5 percent by weight dimethyldi-(N-butylamino)silane.

After mixing for 15 minutes at room temperature the sealant was packaged into 8 ounce plastic tubes. Following storage for 24 hours at room temperature test sheets of elastomer were prepared. The test sheets were allowed to cure for 7 days at room temperature and 50% relative humidity before the tests were conducted. The results for such tests are set forth in Table 1.

TABLE 1

| Me$_2$Si—(NBu$_2$)$_2$ Level, % | Specific Gravity | App. Rate g/min. | Flow in. | Shore A | Tensile (psi) | E-long. % | 50% Modulus |
|---|---|---|---|---|---|---|---|
| 1 | 1.350 | 140–180 | 0.10 | 22 | 224 | 713 | 46 |
| 2 | — | — | — | 25 | 270 | 858 | 51 |
| 5 | — | — | — | 22 | 250 | 881 | 42 |

Example 2

A room temperature vulcanizable composition was prepared in accordance with Example 1, however, the dimethyldi-(N-butylamineo)silane was replaced with dimethyldi-(n-methylacetamido)silane. In this example the level of dimethyldi-(N-methylacetamido)silane present was 1 percent by weight and 2 percent by weight. The results of testing done in the same manner as Example 1 are set forth in Table 2.

TABLE 2

| Me$_2$Si—(NMA)$_2$ Level, % | Specific Gravity | App. Rate g/min. | Flow in. | Shore A | Tensile (psi) | E-long. % | 50% Modulus |
|---|---|---|---|---|---|---|---|
| 1 | 1.350 | 130 | 0.1 | 31 | 229 | 526 | 62 |

TABLE 2-continued

| Me$_2$Si—(NMA)$_2$ Level, % | Specific Gravity | App. Rate g/min. | Flow in. | Shore A | Tensile (psi) | E-long. % | 50% Modulus |
|---|---|---|---|---|---|---|---|
| 2 | — | 176 | 0.1 | 31 | 218 | 537 | 69 |

Example 3

This example illustrates the use of methylvinyldi-(N-methylacetamido silane) wherein the composition was prepared for testing in the same manner as in Examples 1 and 2. The results are provided in Table 3.

TABLE 3

| MeViSi—(NMA)$_2$ Level, % | Specific Gravity | App. Rate g/min. | Flow in. | Shore A | Tensile (psi) | E-long. % | 50% Modulus |
|---|---|---|---|---|---|---|---|
| 1 | 1.350 | 172 | 0.1 | 31 | 224 | 509 | 70 |
| 2 | — | 179 | 0.1 | 33 | 232 | 553 | 68 |

Example 4

In this example the difunctional nitrogen-containing silane utilized was dimethyldi-(N-dimethylamino)silane. Again the silane was tested at levels of 1 percent by weight and 2 percent by weight, with the results set forth in Table 4.

TABLE 4

| Me$_2$Si—(NMe$_2$)$_2$ Level, % | Specific Gravity | App. Rate g/min. | Flow in. | Shore A | Tensile (psi) | E-long. % | 50% Modulus |
|---|---|---|---|---|---|---|---|
| 1 | 1.350 | 154 | 0.1 | 24 | 205 | 500 | 47 |
| 2 | — | 162 | 0.1 | 20 | 177 | 568 | 37 |

I claim:

1. A low modulus room temperature vulcanizable silicone composition substantially free of plasticizer consisting essentially of:
   (A) 100 parts by weight of an organopolysiloxane wherein the silicon atoms at the polymer chain ends are terminated with at least two alkoxy radicals, said organopolysiloxane having a viscosity ranging from about 20,000 centipoise to 500,000 centipoise at 25° C., and
   (B) at least 0.1 part by weight of at least one silane having the formula $$Z_2SiX_2$$

where X is an amino radical, amido radical or aminoxy radical, or mixture of such radicals, and Z is a substituted or unsubstituted hydrocarbon radical or mixture thereof; with the proviso that the cured composition has an ultimate percent elongation of about 500 to 1200.

2. The composition of claim 1 wherein the viscosity of the organopolysiloxane ranges from 30,000 centipoise to 200,000 centipoise at 25° C.

3. The composition of claim 1 wherein the viscosity of the organopolysiloxane ranges from 40,000 centipoise to 80,000 centipoise at 25° C.

4. The composition of claim 1 wherein the silane has the formula $$Z_2SiX_2$$

where X is an amino radical and Z is a substituted or unsubstituted hydrocarbon radical.

5. The composition of claim 4 wherein the silane has the formula $$(R^2)_2Si(NR^1R^2)_2$$

where $R^1$ is hydrogen or a monovalent hydrocarbon radical and $R^2$ is a monovalent hydrocarbon radical.

6. The composition of claim 5 wherein $R^1$ is hydrogen or a C$_{(1-6)}$ alkyl radical and $R^2$ is a C$_{(1-6)}$ alkyl radical, phenyl or vinyl.

7. The composition of claim 1 wherein the silane has the formula $$Z_2SiX_2$$

where X is an amido radical and Z is a substituted or unsubstituted hydrocarbon radical.

8. The composition of claim 7 wherein the silane has the formula $$R_2Si\left(\begin{matrix} R^1 & O \\ | & \| \\ N-C-R^2 \end{matrix}\right)_2$$

where R is a monovalent hydrocarbon radical or alkoxy radical, $R^1$ is hydrogen or a monovalent hydrocarbon radical and $R^2$ is a monovalent hydrocarbon radical.

9. The composition of claim 8 wherein R is methyl or vinyl, $R^1$ is methyl, ethyl or phenyl and $R^2$ is methyl.

10. The composition of claim 1 wherein the silane has the formula $$Z_2SiX_2$$

where X is an aminoxy radical and Z is a substituted or unsubstituted hydrocarbon radical.

11. The composition of claim 10 wherein the silane has the formula $$R_2Si(OY)_2$$

where R is a monovalent hydrocarbon radical or alkoxy radical, and Y is an amino radical of the formula —N(R$^1$)$_2$, where $R^1$ is hydrogen or a monovalent hydrocarbon radical, or a heterocyclic amine attached to silicon by an SiON linkage.

12. The composition of claim 11 wherein R is selected from methyl, ethyl, propyl, phenyl, methoxy, ethoxy and propoxy and $R^1$ is selected from methyl, ethyl, propyl, cyclopentyl and cyclohexyl.

13. The composition of claim 1 wherein the silane is present in an amount of from 0.1 to 10 parts by weight per 100 parts by weight polydiorganosiloxane.

14. The composition of claim 1 wherein the silane is present in an amount of from 0.5 to 5 parts by weight per 100 parts by weight polydiorganosiloxane.

15. The composition of claim 1 further comprising an effective amount of condensation catalyst.

16. The composition of claim 15 further comprising an effective amount of scavenger for hydroxy functional groups.

17. The composition of claim 16 further comprising an effective amount of filler.

18. The composition of claim 17 further comprising an effective amount of adhesion promoter.

19. A method for making a low modulus room temperature vulcanizable silicone composition substantially free of plasticizer consisting essentially of mixing at a temperature of from 0° C. to 180° C. in the substantial absence of moisture:
(A) 100 parts by weight of an organopolysiloxane wherein the silicon atoms at the polymer chain ends are terminated with at least two alkoxy radicals, said organopolysiloxane having a viscosity ranging from about 20,000 centipoise to 500,000 centipoise at 25° C., and
(B) at least 0.1 part by weight of at least one silane having the formula $$Z_2SiX_2$$

where X is an amino radical, amido radical or aminoxy radical, or mixture of such radicals, and Z is a substituted or unsubstituted hydrocarbon radical or mixture thereof; with the proviso that the cured composition has an ultimate percent elongation of about 500 to 1200.

20. The method of claim 19 wherein the viscosity of the organopolysiloxane ranges from 30,000 centipoise to 200,000 centipoise at 25° C.

21. The method of claim 19 wherein the viscosity of the organopolysiloxane ranges from 40,000 centipoise to 80,000 centipoise at 25° C.

22. The method of claim 19 wherein the silane has the formula $$Z_2SiX_2$$

where X is an amino radical and Z is a substituted or unsubstituted hydrocarbon radical.

23. The method of claim 22 wherein the silane has the formula $$(R^2)_2Si(NR^1R^2)_2$$

wherein $R^1$ is hydrogen or a monovalent hydrocarbon radical and $R^2$ is a monovalent hydrocarbon radical.

24. The method of claim 23 wherein $R^1$ is hydrogen or a $C_{(1-6)}$ alkyl radical and $R^2$ is a $C_{(1-6)}$ alkyl radical, phenyl or vinyl.

25. The method of claim 19 wherein the silane has the formula $$Z_2SiX_2$$

where X is an amido radical and Z is a substituted or unsubstituted hydrocarbon radical.

26. The method of claim 25 the silane has the formula $$R_2Si\left(\begin{matrix} R^1 & O \\ | & \| \\ N-C-R^2 \end{matrix}\right)_2$$

where R is a monovalent hydrocarbon radical or alkoxy radical, $R^1$ is hydrogen or a monovalent hydrocarbon radical and $R^2$ is a monovalent hydrocarbon radical.

27. The method of claim 26 wherein R is methyl or vinyl, $R^1$ is methyl, ethyl or phenyl and $R^2$ is methyl.

28. The method of claim 19 wherein the silane has the formula $$Z_2SiX_2$$

where X is an aminoxy radical and Z is a substituted or unsubstituted hydrocarbon radical.

29. The method of claim 28 wherein the silane has the formula $$R_2Si(OY)_2$$

where R is a monovalent hydrocarbon radical or alkoxy radical, and Y is an amino radical of the formula $-N(R^1)_2$, where $R^1$ is hydrogen or a monovalent hydrocarbon radical, or a heterocyclic amine attached to silicon by an SiOn linkage.

30. The method of claim 29 wherein R is selected from methyl, ethyl propyl, phenyl, methoxy, ethoxy and propoxy and $R^1$ is selected from methyl, ethyl, propyl, cyclopentyl and cyclohexyl.

31. The method of claim 19 wherein the silane is present in an amount of from 0.1 to 10 parts by weight per 100 parts by weight polydiorganosiloxane.

32. The method of claim 19 wherein the silane is present in an amount of from 0.5 to 5 parts by weight per 100 parts by wseight polydiorganosiloxane.

33. The method of claim 19 further comprising an effective amount of condensation catalyst.

34. The method of claim 33 further comprising an effective amount of scavenger for hydroxy functional groups.

35. The method of claim 34 further comprising an effective amount of filler.

36. The method of claim 35 further comprising an effective amount of adhesion promoter.

37. The cured composition of claim 1.

38. A method for providing a low modulus silicone sealant substantially free of plasticizer, comprising:
I. applying to a substrate a composition consisting essentially of:
(A) 100 parts by weight of an organopolysiloxane wherein the silicon atoms at the polymer chain ends are terminated with at least two alkoxy radicals, said organopolysiloxane having a viscosity ranging from about 20,000 centipoise to about 500,000 centipoise at 25° C.; and
(B) at least 0.1 part by weight of at least one silane having the formula $$Z_2SiX_2$$

where X is an amine radical, amido radical, aminoxy radical, or mixture of such radicals, and Z is a substituted or unsubstituted hydrocarbon radical or mixture thereof, and
II. allowing said composition to cure.

* * * * *